No. 847,492. PATENTED MAR. 19, 1907.
H. G. MORRIS.
MIXING MACHINE.
APPLICATION FILED FEB. 25, 1905. RENEWED NOV. 28, 1906.
2 SHEETS—SHEET 1.
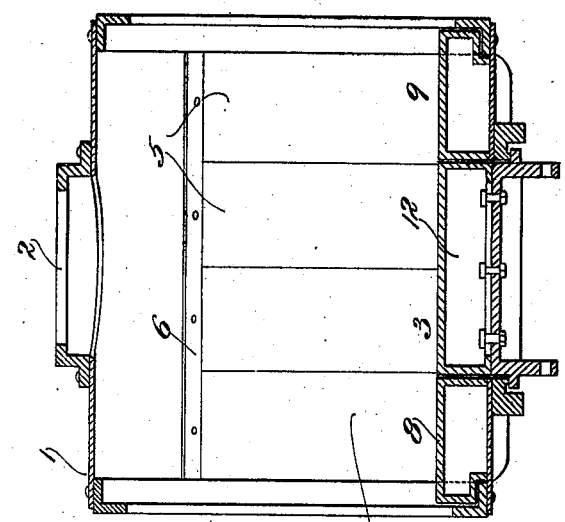
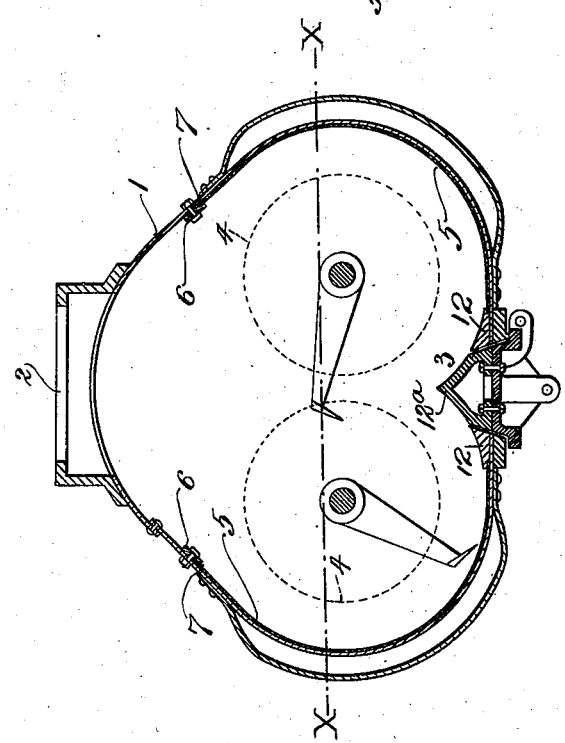
Witnesses:
Frank E. French.
Inventor.
Henry G. Morris.
By Augustus B. Stoughton
Attorney.

No. 847,492. PATENTED MAR. 19, 1907.
H. G. MORRIS.
MIXING MACHINE.
APPLICATION FILED FEB. 25, 1905. RENEWED NOV. 26, 1906.

2 SHEETS—SHEET 2.

Witnesses:
Frank E. French

Inventor.
Henry G. Morris.
By Augustus B. Stoughton
Attorneys.

UNITED STATES PATENT OFFICE.

HENRY G. MORRIS, OF PHILADELPHIA, PENNSYLVANIA.

MIXING-MACHINE.

No. 847,492.          Specification of Letters Patent.        Patented March 19, 1907.

Application filed February 25, 1905. Renewed November 28, 1906. Serial No. 345,538.

*To all whom it may concern:*

Be it known that I, HENRY G. MORRIS, a citizen of the United States, and a resident of Philadelphia, in the county of Philadelphia and State of Pennsylvania, have invented certain new and useful Improvements in Mixing-Machines, of which the following is a specification.

The object of the present invention is to facilitate the renewal of the parts of the mixing-chamber of a mixing-machine, which parts are subjected to wear, and therefore require to be frequently replaced.

To this and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 3:
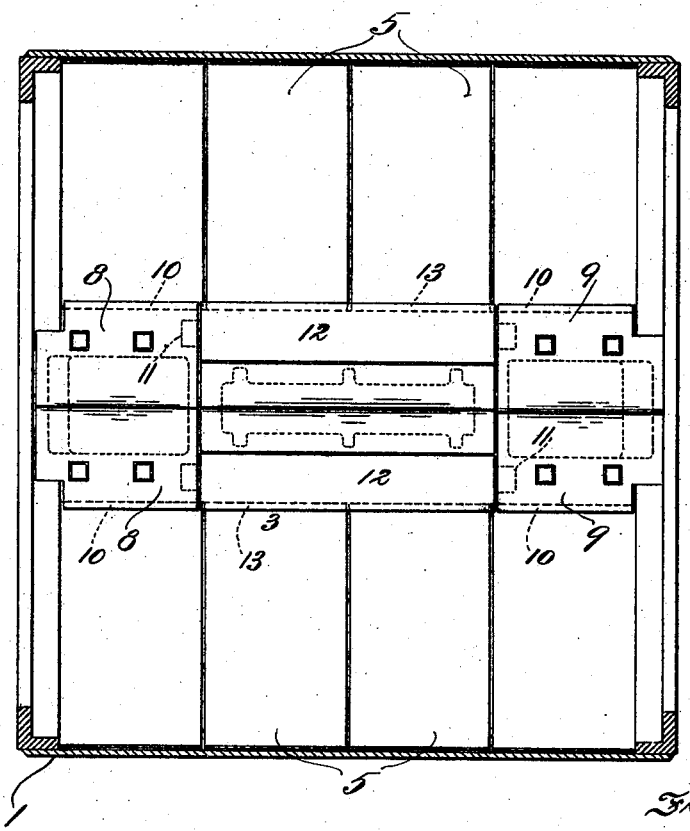
Figure 4:
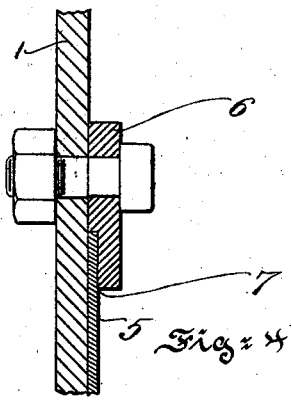

Figure 1 is a transverse sectional view of a mixing-chamber embodying features of the invention. Fig. 2 is a longitudinal view of the same. Fig. 3 is a horizontal sectional view on line X X, drawn to an enlarged scale, of the mixing-chamber shown in Figs. 1 and 2 with the water-jacket omitted; and Fig. 4 is a sectional view illustrating a detail of construction.

In the drawings, 1 is the shell of the mixing-chamber, shown as jacketed and provided with an inlet 2 and an outlet 3 and fitted with a door 12ª. The machine is designed to mix anything required by users, including sand, lime, and the like. There are within this shell agitators, which are indicated at 4 in part by dotted lines for simplicity in illustration and because their detail construction is not a part of the invention.

5 is a wear-plate or lining which is exposed to considerable abrasion and wear, and therefore requires comparatively frequent renewal. As illustrated, this lining consists of sections, (of which eight are shown,) and each section is of a size that will permit it to be passed through one of the openings in the shell or casing—for example, the opening 2.

6 are bars bolted or otherwise secured to the interior of the shell and provided with grooves or recesses 7, into which the ends of the liners 5 may be inserted, so as to be held or secured thereby. These bars 6 are shown to extend for the length of the casing, and they serve to hold the upper ends of all the liners. The casting or castings which are arranged at the base of the shell are also provided with grooves or recesses, into which the lower ends of the liners take and by which they are held or secured. The castings or parts 8 and 9 are shown as bolted to the casing and provided with the grooves, recesses, or undercuts 10, into which the lower ends of the liners take, and these castings are also shown as provided with sockets 11, into which extensions or dowels connected with the parts 12 take. The parts 12 are shown as comprising portions of the door-frame, and they are grooved or recessed, as at 13, which receive the ends of the liners.

From the foregoing description it will be apparent that the liners 5 may be detached by simply loosening the parts, as 6, 8, and 9, which results in loosening the parts 12, and then lifting them or so many of them as need renewals out through the opening in the shell. These liners may be inserted through the opening in the shell and arranged with their ends in proper position in the grooves or recesses which have been described, whereupon the parts may be again tightened or secured to place with the result that the liners will be firmly held.

It will be obvious to those skilled in the art to which the invention relates that modifications may be made in detail without departing from the spirit thereof. Hence the invention is not limited further than the prior state of the art may require; but,

Having thus described the nature and objects of my invention, what I claim as new, and desire to secure by Letters Patent, is—

1. The combination with the mixing-shell closed at its top near its ends and having an opening arranged intermediate of the closed portions of the top which opening is substantially shorter than the length of the shell, of sectional liners each narrower than the length of the casing and adapted to pass through said opening and of recessed or grooved members arranged axially of and movably connected with the interior of the curved wall of the shell and adapted to detachably receive the ends of the liners, substantially as described.

2. The combination of the mixing-shell having inlet and outlet openings shorter than the length of the shell so that the end portions of the same are covered, sectional liners adapted to pass through one of said openings and narrower than the length of the shell, grooved or recessed bars arranged axially of and movably secured to the interior of the curved wall of the shell and adapted to hold the upper ends of the liners, and members arranged at the base of the curved wall of the shell and provided with grooves or recesses for the lower ends of the liners, substantially as described.

3. The combination of a mixing-shell provided with inlet and outlet openings, sectional liners adapted to be passed through the inlet-opening, grooved or recessed bars bolted to the interior of the shell and adapted to hold the upper ends of the liners, castings bolted to the shell at the ends of the outlet-opening and provided with liner grooves or recesses, castings arranged at the sides of the outlet-openings and provided with liner grooves or recesses, and pin-and-groove connections between said castings, substantially as described.

In testimony whereof I have hereunto signed my name in the presence of two witnesses.

HENRY G. MORRIS.

Witnesses:
FRANK E. FRENCH,
K. M. GILLIGAN.